Patented Feb. 25, 1941

2,233,281

UNITED STATES PATENT OFFICE 2,233,281

EXPANDER FOR PLATES OF STORAGE BATTERIES

Oliver W. Brown and John H. Patterson, Bloomington, Ind.

No Drawing. Application April 8, 1939, Serial No. 266,866

2 Claims. (Cl. 136—26)

The present invention relates to storage batteries of the lead-acid type and has particular reference to novel ingredients for pastes used for making up the negative plates of such batteries.

It has been known to the prior art for some fifty years that the addition of certain inorganic and organic compositions of matter, often of unknown composition, technically designated as "expanders," to the pastes used for making up the negative plates of storage batteries results somehow in an increased capacity of thus constituted batteries at ordinary temperatures. The significance of the "capacity" of a storage battery is indicated by the fact that it is an expression of the amount of electricity obtained on discharge.

It has been surmised that expanders effect increased capacity by preventing the contraction and solidification of the spongy lead of the finished plate whereby a greater reactive area is presented to the battery acid. But how this hypothetical maintenance of the porous structure of the finished negative plate is accomplished, and why some compositions of matter and not others should have the ability to effect the same has heretofore not been known, nor has anyone been able to propound a rule according to which it would be possible to predict the action of compositions not previously tested for this purpose. The prior art merely knew empirically that for no apparent reason certain not interrelated inorganic compounds and certain extremely complex organic mixtures containing unknown active principles effect an increased capacity. Aside from these isolated facts, everything was obscure.

Nor was this unsatisfactory status due to lack of investigative efforts. Those skilled in the art have fully realized the advantages to be gained by a more complete comprehension of the nature and effect of expanders and have attempted in many ways to shed some light on this difficult field.

A more specific survey of the numerous compositions investigated will illustrate how this complex problem has heretofore baffled those skilled in the art. The following discussion will particularly concern the organic expanders, for it is conceivable that inorganic expanders such as ground sulfur, pumice stone, gypsum, barium sulfate, silica, coke, graphite, carbon, hydro-sulfide of ammonia, and others, might mechanically prevent the coalescence and solidification of the porous lead. In the case of organic expanders, however, there are encountered, not definite chemical entities, but mixtures usually of vegetable origin having a chemical composition complex and uncertain, whose nature depends on the material from which they are prepared, on the nature of the chemical reagents used for their preparation, on the conditions under which preparation takes place, such as temperature, pressure, and the like, and also on the method of isolating the finally resulting bodies from the reacting mixture.

Very early, purely natural products such as ground wood, straw, cork and other barks, plants, seaweeds, grasses, seeds, potatoes, and the like, were found useful as expanders. These experiences led to the use of substances isolated or derived from vegetable sources, such as carbohydrates, in particular cellulose, lignin, resins such as shellac, rosin, amber, and other fossil gums, extracts such as aloin, alginic acid, and others. The next step involved the use of chemically modified vegetable products, for instance sugar, cellulose or other carbohydrates partly carbonized by sulfuric acid, sawdust soaked with barium sulfide solution and thereafter treated with a soluble sulfate, humic substances derived from natural humins by an alkaline extraction, from the carbonization of carbohydrates, from the oxidation of phenols, or from the composting of tan bark, and others, some of which were further treated, for instance, with a solution of a lead salt. Even the more or less similar members of this conglomerate group of compositions were not prepared by similar methods, used in the same proportions, incorporated in the same manner, or subjected to the same after treatment subsequent to making up the plate so that fruitful comparisons were impossible, especially in view of the fact that some of the proposed organic expanders are soluble in battery acid so that in the course of time they are dissolved out of the plate causing an initially high but subsequently gradually diminishing capacity, whereas other expanders remain permanently in the plate.

An inspection of the detailed directions disclosed, for instance, for the composting and subsequent extraction of tanbark, for the purpose of preparing a definitely acting but constitutionally unknown mixture of what are known as humic substances, or those disclosed for the optionally alternate treatment with lead sulfate solution or drying followed by roasting of waste sulfite liquor, or for the partial carbonization with sulfuric acid of hemp followed by addition of lead oxide, shows that the art of preparing organic expanders has heretofore been practiced according to the equivalent of cook book recipes. This impression is confirmed by the prior art use of feathers treated with sodium sulfite, of pulled sheep's wool treated with sodium sulfide, or carroted wool, and of finely comminuted animal hairs, to the exclusion of simply shorn wool. The use of beeswax may also be mentioned in this connection.

In the above discussion, the influence of organic expanders on capacity has been concerned with effects at ordinary temperatures. However, claims have been made for the humic substances produced by the carefully controlled composting of tanbark, alkaline extraction of natural humins, the severe sulfuric acid treatment of carbohydrates, or the oxidation of phenols, for the compounds formed by the interaction of solutions of lead compounds with certain not identified components of waste sulfite liquor, and for similar lead compounds of hemp partly carbonized by sulfuric acid, as expanders able to increase the capacity of storage batteries at low temperatures, which capacity, however, is still not made anywhere near equal to that at ordinary temperatures.

The significance of this claim for an increased capacity at lower temperatures is apparent from a fact of which the prior art has been aware for many years, namely, that the capacity of storage batteries at low temperatures is far below that at ordinary temperatures. The expanders indicated in the previous paragraph represent the only partially successful result of a long search for the solution of the problem just stated, namely, the utterly unsatisfactory performance of prior art storage batteries at low temperatures. For this reason, it has heretofore been necessary to equip vehicles propelled by internal combustion engines with storage batteries whose capacity at ordinary temperatures far exceeds the need at those temperatures, in order to insure starting in cold weather, when the then difficult starting of the engine makes a demand for extra power on the batteries.

The present status of the prior art is thus the following: The art has fully realized the need for storage batteries having capacities not greatly reduced at lower temperatures. Numerous researches have been directed to the solution of this problem. It has been recognized that the unknown active principles of certain extremely complex organic compositions used as expanders are able to partially remedy the defect indicated. But on the whole, the art remains in a primitive, unscientific stage.

It is, therefore, an object of the present invention to rationalize the purely empirical prior art relating to organic expanders by correlating the capacitating abilities of organic compounds with certain measurable and predictable reactivities of the same.

A further important object of this invention is to provide organic expanders representing definite chemical entities, in place of the poorly defined, complex mixtures of unknown constitution heretofore used.

Another important object of the present invention is to provide organic expanders capable of permanently effecting a capacity at low temperatures not greatly reduced from that at ordinary temperatures.

Other and further important objects of this invention will become apparent from the following description and appended claims.

We have found that the inclusion in the paste for making up the negative plates of storage batteries of the lead-acid type, in place of or together with the commonly used inorganic expanders, of a composition substantially insoluble in battery acid selected from the group consisting of phenols having a potency as reducing agents substantially greater than that of ordinary phenol, or carbolic acid, metallic (preferably lead) compounds, esters, and ethers of such phenols as well as the condensation products of said phenols with carbonyl compounds, will result in a battery whose capacity at low temperatures may be made greater than heretofore possible.

As indicated, all phenolic compounds are not necessarily effective. The desired effect is obtained only from those phenolic compounds that comprise phenolic constituents having a potency as reducing agents substantially greater than that of ordinary phenol, or carbolic acid, which, together with its salts, esters, ethers and carbonyl condensation products, is not effective. The reducing potency should preferably be at least equal to that of beta naphtol.

A permanent effect is obtained only by the use of phenolic compounds substantially insoluble in battery acid. Hydroquinone, for instance, being soluble and gradually removed by dissolution in battery acid, does not give the desired permanent effect.

Among the phenolic compounds comprising the effective class indicated may be mentioned first of all some free phenols such as beta naphthol and polyhydroxy phenols with long aliphatic side chains, for instance, the condensation product of hydroquinone with amylene or di-isobutylene. While polyhydroxy phenols without alkyl substitutions on the ring generally are too soluble for use per se, their lead compounds are suitable. We mention the lead compounds of catechol, resorcinol, hydro quinone and trihydroxy benzenes.

The compounds of polyhydroxy phenols with carboxylic acids, ketones and aldehydes are also operative. Among the carboxylic acids the polybasic acids, such as phthalic and maleic acids, are particularly adapted to form polyhydroxy phenolic condensation products that are excellent expanders. The group comprising aldehydes and ketones furnishes among others furfuraldehyde, whose condensation products with suitable polyhydroxy phenols possess the desired characteristics.

These novel organic expanders are used in place of or together with the commonly used inorganic expanders, in particular barium sulfate. The amount of organic expander added may be varied within rather wide limits, but is preferably less than five per cent, in many cases less than one per cent of the oxides of lead used in making up a paste for the negative plates. Other details of use do not vary from those known to the prior art.

The above disclosed principles will be sufficient to enable those skilled in the art to manufacture storage batteries having capacities at low temperatures greatly superior to those of batteries heretofore known. A judicious choice of proportions and methods of preparation, to which those skilled in the art will be guided by the present disclosure in the light of their prior knowledge, will make possible the manufacture of batteries whose capacity is not greatly reduced by low temperatures. For instance, a 6-volt, 13-plate standard starting battery comprising a high grade prior art expander, at 0° F. and 300 amperes discharge rate, gives on discharge 2.25 minutes, while the same size and type of battery built in the same manner using our novel type of expander, gives on discharge 4.97 minutes under the above conditions. It will thus be seen that we have disclosed an entirely novel type of expanders for storage batteries of a capacitating effect greatly superior to that of prior art expanders.

In order to further illustrate the working of the present invention by examples, the following preferred forms will be described in detail.

Example I

This example shows the use of a phthalic acid compound of hydroquinone as an expander.

This novel expander may be prepared by heating, preferably refluxing, together about one part by weight of hydroquinone and one part of phthalic acid anhydride until on cooling the mixture is rather sticky and hard. The mixture is then boiled with water and the water poured off. The residue becomes hard and brittle on cooling, after which it is dried and pulverized so as to pass a 40 mesh or finer sieve. The ground material has a dark brown color.

The use of catalysts such as sulfuric acid in preparing this type of expander is optional.

A paste for making up the negative plates of storage batteries is prepared by mixing 400 grams red lead, 3564 grams litharge, 24 grams of the above disclosed novel expander comprising a compound of hydroquinone and phthalic acid and 12 grams precipitated barium sulfate, adding to the resulting mixture 310.7 cubic centimeters of water, mixing thoroughly, gradually adding 310.7 cubic centimeters of sulfuric acid of a specific gravity of 1.200 at 20° C. and mixing in the usual manner in order to produce the finished plates which have a capacity when discharged at 300 amperes at −10° F. up to 0° F. greater than has previously been obtained at these low temperatures.

The amount of organic expander used is variable within wide limits, and the addition of barium sulfate may be omitted.

The exact method of preparing the compound of hydroquinone and phthalic acid may be varied to a considerable extent, and other polyhydroxy phenols such as catechol, resorcinol or phloroglucinol may be used in place of hydroquinone.

Example II

The example involves the use of a lead compound of hydroquinone as an expander.

In general, this expander is prepared by warming a mixture of hydroquinone, litharge and water, with stirring, until any reactions appear to be over. The color will change from the deep yellow of the litharge to a cream or even lighter color. The solid material is then filtered off, washed with water and dried, preferably at a temperature not above 120° to 130° C. During the drying the color changes to a dark grey or sponge lead color. The dry material may be ground and put through a 40 mesh or finer sieve. A catalyst such as sulfuric acid may be used in preparing an expander of this type.

The following specific method produces an excellent expander of this kind. Water is added to a mixture of one part by weight of hydroquinone and 2.03 parts of litharge, the resulting mixture being heated to boiling, with stirring. There appears to be a chemical reaction, and the color changes from the deep yellow of the litharge to a light cream color. The mixture is allowed to cool over night, when brown crystals form at the surface. Another 2.03 parts of litharge are then added together with more water, and the mixture is again heated. The mixture is then allowed to stand over night a second time. The solid material is finally washed three times with water by decantation, filtered off, dried in an oven at not above 120° to 130° C., the heat being cut off when the material is nearly dry, and the dried material ground until all will pass a 40 mesh sieve. The finished product has a dark grey color.

When three percent of this expander, with or without a little (around 0.30 per cent) barium sulfate is mixed with litharge or a mixture of litharge and red lead and made into a paste for the negative plates of storage batteries, a plate effecting a heretofore not possible capacity at low temperatures may be produced.

The amount of expander used can be varied within wide limits, and the similarly prepared lead compounds of catechol, resorcinol, or other polyhydroxy phenols may be substituted for that of hydroquinone.

Example III

This example illustrates the use of a furfural compound of hydroquinone as an expander.

An excellent expander may be made by the following specific method. Hydroquinone and furfural are mixed in the proportion of one gram of hydroquinone to two cubic centimeters of furfural. The mixture is heated, with reflux, for several hours, the temperature being increased to 156° C. It is then transferred to a free flame and heated strongly until fumes of furfural are evolved. The mixture becomes quite thick, and after cooling, hard and brittle. The black, hard material obtained after cooling is powdered and passed through an 80 mesh sieve.

0.6 per cent of this material with or without a small amount of barium sulfate is a suitable amount for addition to the oxides of lead used in making the negative paste for a lead storage battery. The result is a heretofore not possible capacity at low temperatures.

If desired, as much as two grams of hydroquinone may be used for each cubic centimeter of furfural, and a catalyst such as sulfuric acid may be added.

Example IV

This example relates to the use of beta naphthol as an expander.

Beta naphthol is ground in a ball mill with litharge, and the resulting mixture is added to the litharge or mixture of litharge and red lead ued in making the negative plates of lead storage batteries which is prepared in the usual manner. A satisfactory proportion of beta naphthol is 0.6 per cent. However, other proportions may also be used.

Instead of beta naphthol, its lead compound may be used. It is prepared by heating a mixture of water, litharge and beta naphthol until there appears to be no further reaction, washing the solid material with water, separating, drying and grinding the same.

Other free phenols substantially insoluble in battery acid and at least as good reducing agents as beta naphthol may be used, for instance, the condensation products of hydroquinone or catechol with amylene, di-iso-butylene, amyl alcohol or like compounds.

All these expanders also effect a heretofore not possible capacity at low temperatures.

The novel expanders of which the above examples are given comprise compositions substantially insoluble in battery acid selected from the group consisting of free phenols having a potency as reducing agents greater than that of ordinary phenol, or carbolic acid, functional derivatives of such phenols such as salts, esters and ethers, and condensation products of such phenols with carbonyl compounds such as acids, ketones and aldehydes.

The herein disclosed novel expanders may possibly exert their beneficial effects by being dissolved by the battery acid in extremely minute quantities. The beneficial effects may be directly connected with the reducing properties of the phenolic constituents of these novel expanders, or they may be merely correlated therewith. Possibly these novel expanders influence the viscosity of the battery acid and aid the diffusion thereof through the pores of the plates. We do not know which, if any, of the above hypotheses are correct.

As pointed out hereinbefore, we are aware that numerous details of the present invention may be varied through a wide range without departing from the principles of the same, and we, therefore, do not purpose limiting the patent granted hereon otherwise than necessitated by the appended claims.

We claim as our invention:

1. A paste for the negative plates of a storage battery comprising an oxide of lead and a reaction product of a polyhydroxy phenol and a dibasic carboxylic acidic substance.

2. A paste for the negative plate of a storage battery comprising an oxide of lead and a reaction product of hydroquinone and phthalic anhydride.

OLIVER W. BROWN.
JOHN H. PATTERSON.